Sept. 19, 1950 M. A. ADAMS 2,522,808
HOOK ATTACHMENT FOR ARTIFICIAL BAIT
Filed April 8, 1947
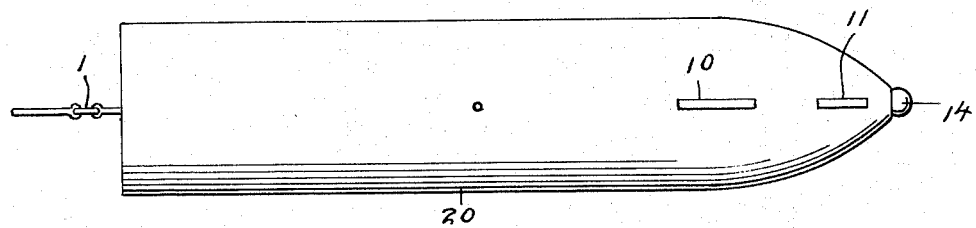
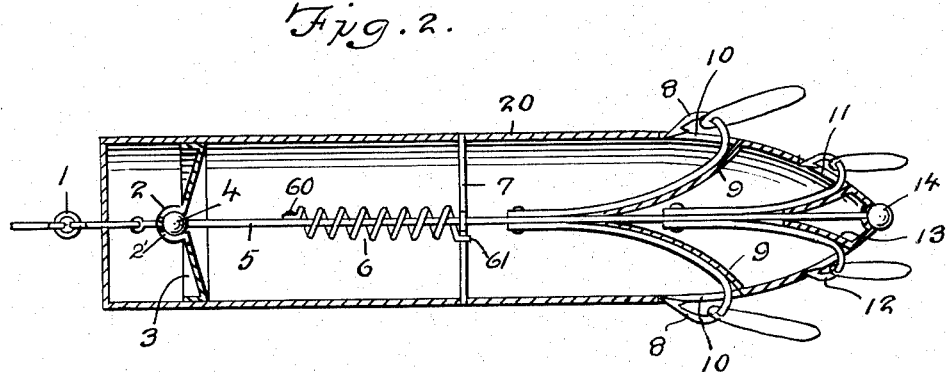
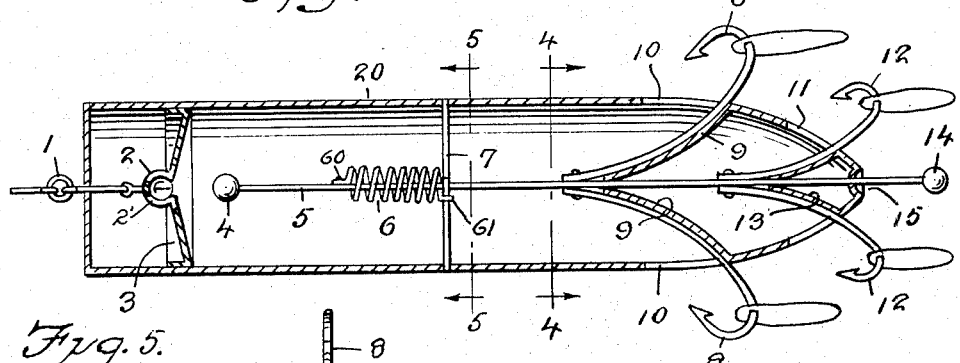
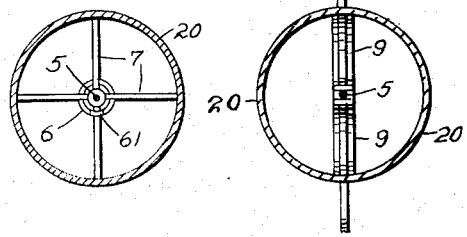
INVENTOR.
Mozel A. Adams
BY Victor J. Evans & Co.
ATTORNEYS Patented Sept. 19, 1950

2,522,808

UNITED STATES PATENT OFFICE 2,522,808

HOOK ATTACHMENT FOR ARTIFICIAL BAIT

Mozel A. Adams, Evangeline, La.

Application April 8, 1947, Serial No. 740,077

2 Claims. (Cl. 43—35)

This invention relates to improvements in attachments to be used in artificial bait, with no hooks hanging when cast and which will be absolutely weedless.

It is an object of the invention to provide a hook attachment having a small steel pin running therethrough, the pin having a ball at each end thereof, the ball at one end being used to set hooks in the attachment, and the ball at the other end being used to cooperate with a spring clasp or clip to hold the hooks in a definite position in the attachment.

A further object is to provide an artificial bait having spring means which automatically traps a fish upon the slightest pull on a hook.

A further object is to provide a bait attachment which will maintain a definite position when cast and upon striking the water, the attachment having hooks which will be released upon the slightest pull thereon.

These and other objects are attained by the novel construction and arrangement of parts hereinafter described and illustrated by the accompanying drawings, forming a part hereof, and in which:

Fig. 1 is a side view of a bait attachment embodying the invention.

Fig. 2 is a sectional view of the device with the hooks mainly inserted in a casing.

Fig. 3 is a sectional view of the device with the hooks extended.

Fig. 4 is a sectional view taken on the line 4—4 of Fig. 3.

Fig. 5 is a sectional view on the line 5—5 of Figure 3.

Referring to the drawings, the bait attachment is shown to comprise an eye 1 adapted to be connected to a line, and a casing 20. The eye 1 is connected to spring clasp or clip 2 which is connected to a cup shaped spring member 3 positioned in the casing 20.

The clasp is radially split as at 2' to receive a ball 4 attached to a pin 5, to which is connected by a rivet or similar means 60 one end of a spring 6. The spring 6 at its opposite end is provided with a loop 61, which is connected to the cross-shaped pin 7 attached at its outer ends to the casing 20. Attached to the pin 5 are spring hooks 8, guided by arcuate members 9, and passing through openings 10 in the casing 20.

A second pair of hooks 12 pass through apertures 11 in the casing 20, and are guided by the arcuate members 13, the casing 20 being substantially bullet shaped.

At the end of the pin 5 is a ball 14 arranged to seat in a recess 15 in the pointed end of the casing 20.

In operation, the pin 5 is forced into the casing 20 to cause the ball 4 to seat in the clasp 2 and the ball 14 to rest in the recess 15. This draws the hooks 8 and 12 to move within the casing 20. When a fish grabs or bites on one of the hooks, the ball 4 is quickly released from the clasp 2, allowing the spring 6 to cause the hooks to extend and trap whatever fish may engage the hooks.

When the bait attachment is dropped into the water the hooks remained in the casing until engaged by a fish.

It will be seen that there has been provided a bait attachment which can be dropped into the water without danger of being obstructed by weeds and the like, and which quickly entraps fish immediately upon contact with the hooks.

The above description is to be considered as illustrative and not limitative of the invention of which modifications can be made without departing from the spirit and scope of the invention as set forth in the appended claims.

The invention having been described, what is claimed is:

1. In a bait attachment device, a casing having apertures therein, a plurality of hooks projecting through the apertures, a pin to which the hooks are attached, a recess at the rear end of the casing, a ball on the rear end of the pin adapted to be seated in said recess, a spring connected at one end to the pin, a ball at the forward end of the pin, a spring clasp in the casing arranged to engage the last said ball, and a cross-shaped pin to connect the other end of the spring to the casing.

2. The structure set forth in claim 1 further characterized by said casing having arcuate members connected thereto at one end of the apertures and adapted to engage the pin and the hooks to guide the hooks outwardly of the casing through the apertures.

MOZEL A. ADAMS.

REFERENCES CITED

The following references are of record in the file of this patent:

UNITED STATES PATENTS

| Number | Name | Date |
|---|---|---|
| 231,049 | Inskeep | Aug. 10, 1880 |
| 382,903 | Richardson | May 15, 1888 |
| 1,009,538 | Lowe | Nov. 21, 1911 |
| 1,467,750 | Borg | Sept. 11, 1923 |
| 2,326,876 | Miller | Aug. 17, 1943 |
| 2,439,391 | Jobson | Apr. 13, 1948 |